April 19, 1949.    B. STOUDT ET AL    2,467,636
ELECTRODE DIE FOR WELDING APPARATUS
Filed July 24, 1948    2 Sheets-Sheet 2

INVENTORS
B. STOUDT AND
A. GIORDANO.
BY J. Ledermann
ATTORNEY.

Patented Apr. 19, 1949

2,467,636

UNITED STATES PATENT OFFICE 2,467,636

ELECTRODE DIE FOR WELDING APPARATUS

Bernard Stoudt, Valley Stream, and Anthony Giordano, Brooklyn, N. Y., assignors to Ames Spot Welder Co., Inc., Brooklyn, N. Y., a corporation of New York Application July 24, 1948, Serial No. 40,536

13 Claims. (Cl. 219—4)

1

This invention relates to spot welding apparatus, and the main object is the provision of electrode dies for use in welding together tubes or tubular bodies. One application of the invention lies in the field of manufacture of tubular furniture.

It is well known that tubes and tubing, as they are commercially available, do not have perfectly smooth surfaces but on the contrary their surfaces are irregular in that they contain, in greater or lesser quantities, raised and depressed spots or areas. In welding tubes together, currents of high amperage are required, and hence electrodes having wide areas of contact with the tubes, are necessary. When a relatively unyielding electrode surface is applied to the tube, it is apparent that electric contact is made only with the raised portions of the tube surface, so that an excessive amount of current flows through such portions, with consequent spotting or damaging of the tube surface. The electrodes of the instant invention are intended to provide practically complete and even electrical contact with the tube surfaces throughout the area of the electrode, so that the flow of current between the electrode and the tube is of a constant density, with the result that a proper and strong weld is obtained without any damage to the tube surfaces.

The above broad as well as additional and more specific objects will be clarified in the following description, wherein characters of reference refer to like-numbered parts in the accompanying drawings. It is to be noted that the drawings are intended solely for the purpose of illustration, and that it is therefore neither intended nor desired to limit the invention to any or all of the exact details of construction shown except insofar as they may be deemed essential to the invention.

Referring briefly to the drawings.

2

Figure 2:
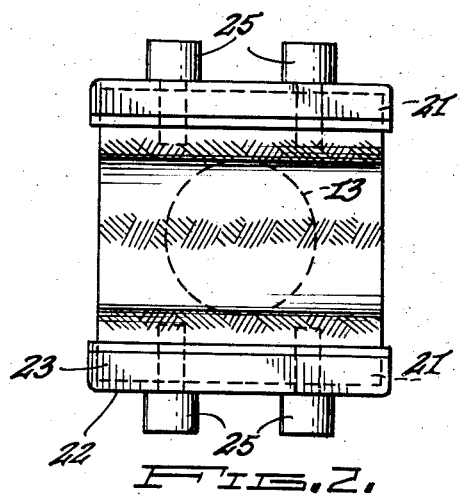
Fig. 2 is a top plan view of the lower electrode die of Fig. 1 as well as a bottom plan view of the upper electrode die of Fig. 1.
Figure 4:
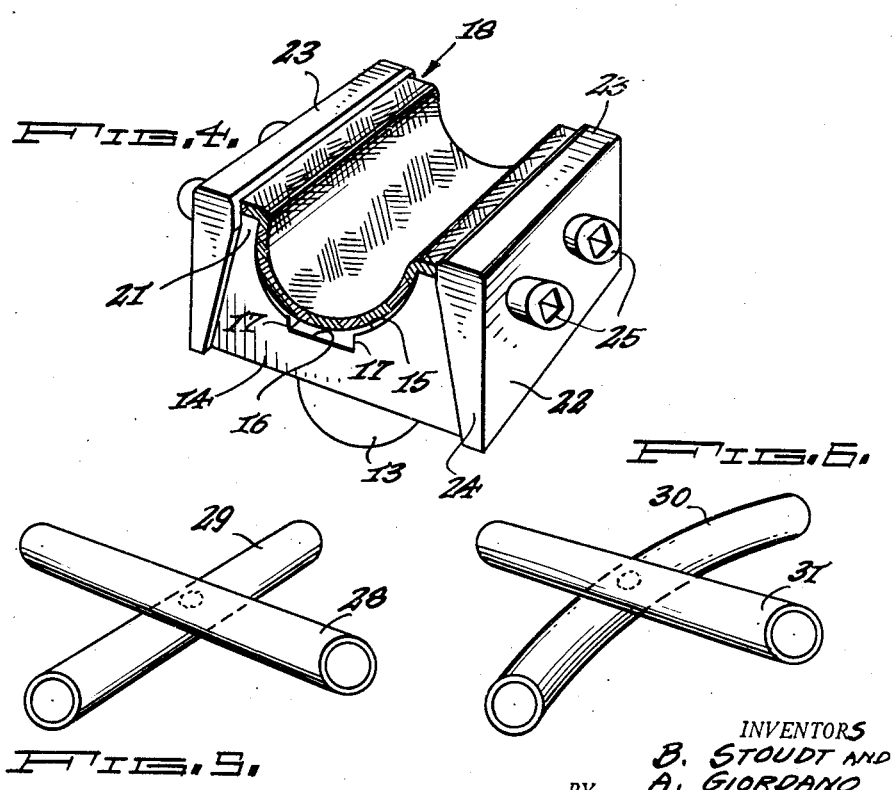

Fig. 4 is a perspective view of the electrode die shown in Fig. 2.

Figure 5:
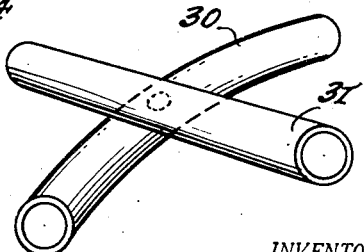

Fig. 5 is a fragmentary perspective view of a pair of straight tube sections which have been welded together.

Fig. 6 is a similar view showing a straight tube section welded to a curved tube section.

Fig. 7 is a perspective view of a detail of the electrode die.

Fig. 8 is an enlarged fragmentary plan view illustrating one way of making the yieldable mesh or mat lining of the electrode die.

Referring in detail to the drawings, the numeral 10 indicates the upper and the numeral 11 the lower of the two electrode holders of a spot welding machine otherwise not shown. At their juxtaposed extremities the holders 10 and 11 are provided with sockets 12 receptive of bosses 13 on the electrode dies, and additional means, not shown, is provided for releasably securing the bosses 13 in the sockets 12.

The die shown in Figs. 2 and 4, which is adapted for use on straight tubes, comprises a casting or block 14 having a substantially semi-cylindrical longitudinal groove 15 therethrough. The base of the groove 15 is cut out to provide a trough 16 of relatively small depth and which may have, as illustrated, opposed side walls substantially or approximately at right angles to the base of the trough, as shown at 17.

The entire upper face (Figs. 2 and 4) of the block 14 is covered with a flexible mat of conducting material, such as, by way of example, copper. The block 14 is likewise formed of conducting material, and this material may also be copper, as well as brass or any other suitable material.

The mat, which is shown at 18, may be formed in any suitable manner. One way of making the mat is illustrated in Fig. 8, wherein groups or strands of copper wire 19 are formed of a number of individual copper wires 20 laid side by side, and the groups 19 are interlaced to form the mat 18. Such a mat obviously possesses the property of yieldability or flexibility in all directions.

The groove 15 is of lesser width than the width of the block 14, thus providing shoulders 21 at the sides of the groove. The mat 18 is mounted substantially as shown, on the block 14, with the midportion thereof following the curvature of the groove 15 and the end portions thereof positioned on the shoulders 21. The ends of the mat are locked in position on the shoulders 21 by any suitable means. One such means is illustrated in the drawings, and comprises a plate 22 having a flange 23 at the top and two side flanges 24. These plates are positioned against the sides of the block 14, with the edges of the mat on the shoulders 21 held down against these shoulders by the top flanges 23. Screws 25 passing through holes 26 in the plate 22 hold the plate on the block. The side flanges 24 engage the end corners of the block.

Figure 1:
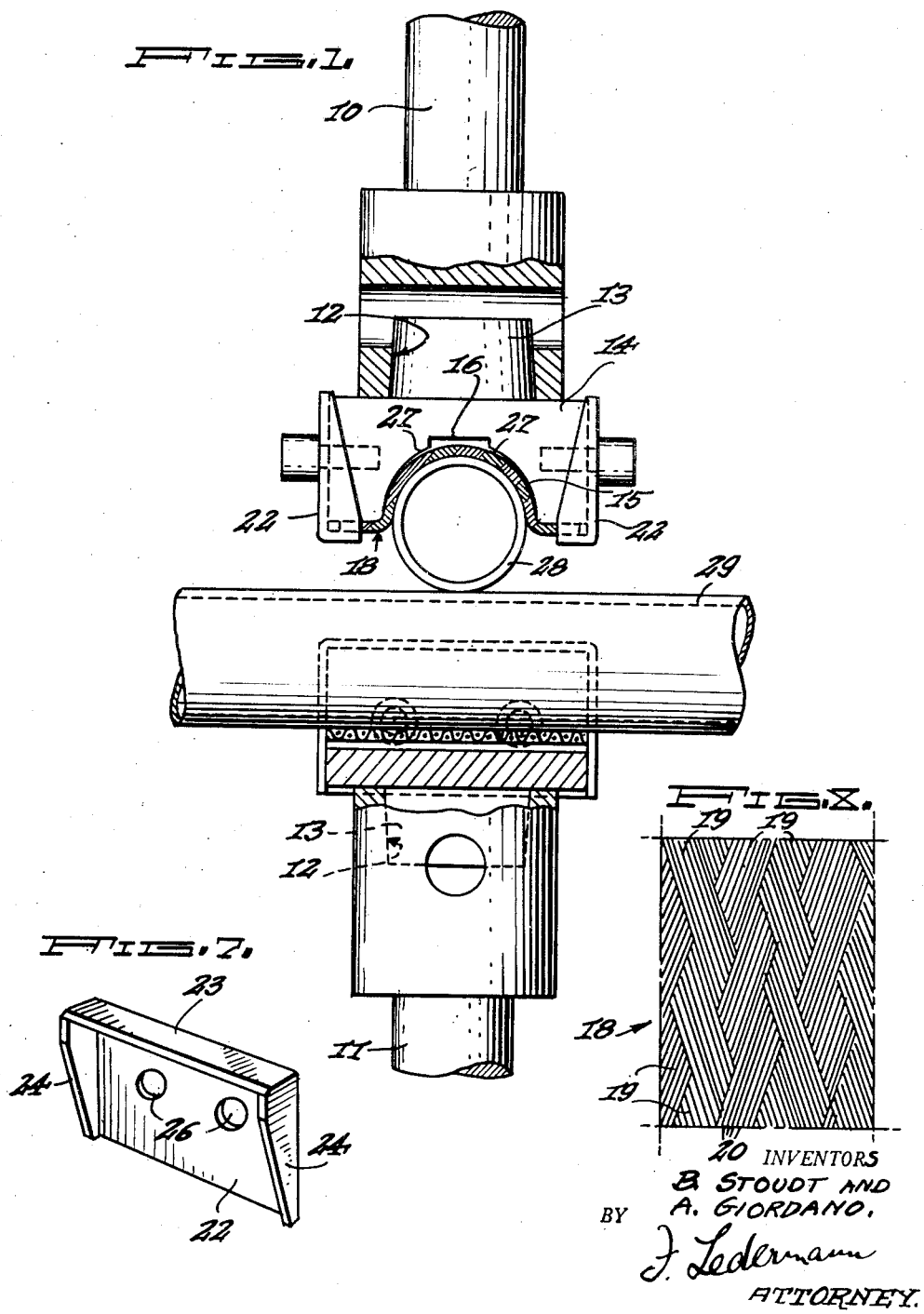
Fig. 1 is a front elevational view of the juxtaposed fragments of the electrodes of a spot welding machine, with parts broken away and partly in section, illustrating an embodiment of this invention.

The transverse length of that portion of the mat 18 which is rounded substantially to follow the curvature of the groove 15, may be smaller than the rectified length of the arc of a cross-section of the groove 15, so that normally a small space shown at 27 in Fig. 1 is left between the mat 18 and the areas of the groove 15 on the sides of the trough 16.

In Fig. 1 two straight sections of tubes, 28 and 29, are shown in position in the grooves of the electrode dies of the form just described, just prior to the application of pressure on the upper electrode 10. Upon the application of such pressure, it is apparent that the midportion of the mat 18 will be forced against the midportion of the groove 15 to close or nearly to close the spaces 27, and since the trough 16 permits of free movement of the midportion of the mat positioned adjacent the trough, the latter portion of the mat is free to move to a greater or less distance into the trough. However, all such movement of the midportion of the mat, to fill the spaces 27 or to enter the trough 16, amounts to a stretching of the mat whereby the surface of the mat is more tightly held against the tube. Owing to the nature of the said surface of the mat, as is evident from its structure as illustrated and described, a very high area of surface contact between the mat and the tube is attained, for the individual wires 20 of which the mat is composed are free to adjust their positions not only to pass over and contact the tops of protuberances on the tube surface but also to pass around the sides of such protuberances as well as to register in surface depressions. Thus a maximum flow of current and a maximum even distribution of the current through the tube surface is obtained. After completion of the welding operation, upon raising the electrode 10, the mat will again, owing to its inherent resiliency, assume its original condition and position.

Figure 3:
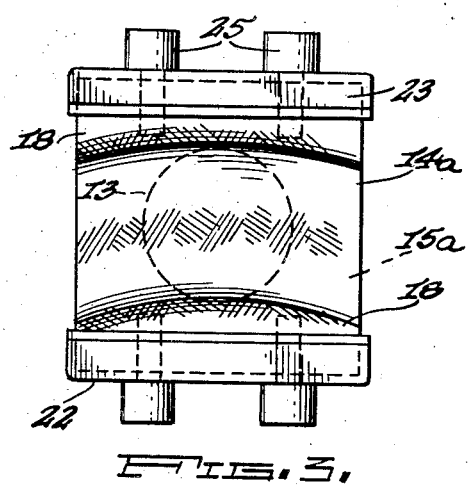
Fig. 3 is a view similar to Fig. 2, but showing a die suitable for application to a curved tube.

The electrode die shown in Fig. 3 is identical in all respects to the die shown in Figs. 2 and 4 and above described, with the single exception that the longitudinal groove 15a, equivalent to the groove 15 of the block 14, is curved in its passage through the block 14a. This form of the die is applicable in welding curved tubes, as, for example, in welding the curved tube 30, Fig. 6, to the straight tube 31.

It is to be understood that although the tubes shown in the drawings are illustrated as cylindrical, and the grooves 15 and 15a in the blocks 14 and 14a, respectively, are shown semi-cylindrical, or semi-circular in cross-section, it is not desired or intended to limit the invention to the construction of grooves which are of semi-circular cross-section for use on tubes having circular cross-sections. On the contrary, the grooves 15 and 15a may be of any suitable cross-sectional conformation so that the electrode dies may be used for welding together tubes or other pieces of work of whatever external cross-sectional conformation they may possess.

Obviously, modifications in form and structure may be made without departing from the spirit or scope of the invention.

We claim:

1. An electrode die adapted to form the contact tip of an electrode of a device, such as, by way of example, a welding machine, comprising a body having a groove in one side thereof, a yieldable mat-like member of conducting material mounted on said side of said body, the intermediate portion of said member being deformed into a bulge projecting into said groove.

2. The electrode die set forth in claim 1, having means for anchoring the edges of said member adjacent said intermediate portion thereof to the body.

3. The electrode die set forth in claim 1, said member comprising a plurality of interwoven braids, each of said braids comprising a plurality of wires positioned side by side.

4. The electrode die set forth in claim 1, said body having a trough therein at the base of said groove.

5. The electrode die set forth in claim 1, said groove and said bulge being arcuate in cross-sectional conformation, the rectified cross-sectional arc of said groove being of greater length than the rectified cross-sectional arc of said member thereby providing a space between the base of said groove and the adjacent portion of said member.

6. An electrode die adapted to form the contact tip of an electrode of a device, such as, by way of example, a welding machine, comprising a block having a groove in one side thereof and having shoulders along the opposed edges of the groove, a yieldable mat-like member of conducting material having the intermediate portion thereof deformed into a bulge, said member being mounted on said block with said bulge projecting into said groove and the edges thereof adjacent said bulge positioned against said shoulders, and means for locking said edges of said member against said shoulders.

7. The electrode die set forth in claim 6, said means comprising plates secured to the two opposing sides of said block which have said one side therebetween, said plates having flanges extending toward each other, said edges of said member registering between said flanges and said shoulders and being clamped against said shoulders by said flanges.

8. The electrode die set forth in claim 6, said block having a trough therein at the base of said groove.

9. The electrode die set forth in claim 6, said block having a trough therein at the base of said groove, the opposed sides of said trough being substantially parallel with each other.

10. An electrode die adapted to form the contact tip of a device, such as, by way of example, a welding machine, comprising a body having a groove in one side thereof, a yieldable mat-like member of conducting material mounted on said side of said body, the intermediate portion of said member being deformed into a bulge projecting into said groove, the depth of said groove being greater than the depth of said bulge.

11. The electrode die set forth in claim 6, the depth of said groove being greater than the depth of said bulge.

12. The electrode die set forth in claim 1, said groove and said bulge being complementarily arcuate lengthwise.

13. An electrode die adapted to form the contact tip of an electrode of a device, such as, by way of example, a welding machine, comprising a body having a groove in one side thereof between the ends of the body, a yieldable mat-like member of conducting material of greater length than the length of said body having the opposed ends thereof secured to said ends of said body on said side of said body thereby providing a bulge between said ends of said member, said bulge projecting into said groove.

BERNARD STOUDT.
ANTHONY GIORDANO.

REFERENCES CITED

The following references are of record in the file of this patent:

UNITED STATES PATENTS

| Number | Name | Date |
|---|---|---|
| 475,191 | Burton et al. | May 17, 1892 |
| 2,366,164 | Weick et al. | Jan. 2, 1945 |

FOREIGN PATENTS

| Number | Country | Date |
|---|---|---|
| 257,858 | Great Britain | Sept. 9, 1926 |